(12) United States Patent
Dag et al.

(10) Patent No.: US 12,427,539 B2
(45) Date of Patent: *Sep. 30, 2025

(54) METHOD FOR COATING PRODUCTS (71) Applicant: PAPACKS SALES GMBH, Cologne (DE)

(72) Inventors: Tahsin Dag, Cologne (DE); Florian Barth, Cologne (DE); Memet Dag, Arnstadt (DE)

(73) Assignee: PAPACKS SALES GMBH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/187,281

(22) Filed: Apr. 23, 2025

(65) Prior Publication Data

US 2025/0249476 A1    Aug. 7, 2025

Related U.S. Application Data (63) Continuation of application No. 18/765,990, filed on Jul. 8, 2024.

(30) Foreign Application Priority Data

Oct. 30, 2023    (DE) .............................. 102023129975

(51) Int. Cl.
*B05D 1/00*    (2006.01)
(52) U.S. Cl.
CPC .................................... *B05D 1/005* (2013.01)
(58) Field of Classification Search
None
See application file for complete search history.

(56) References Cited

U.S. PATENT DOCUMENTS

| | | | |
|---|---|---|---|
| 240,091 | A | 4/1881 | Smith |
| 1,918,782 | A | 7/1933 | Randall |
| (Continued) | | | |

FOREIGN PATENT DOCUMENTS

| | | |
|---|---|---|
| CA | 2362798 A1 | 8/2000 |
| DE | 19906398 A1 | 8/2000 |
| (Continued) | | |

OTHER PUBLICATIONS

European Search Report, EP Application No. 24205716.4, dated Apr. 16, 2025.

*Primary Examiner* — Joshua L Allen
*Assistant Examiner* — Bradford M Gates
(74) *Attorney, Agent, or Firm* — NEO IP (57) ABSTRACT

A method for coating products is provided. The method includes the steps of applying a coating liquid to a product and removing excess coating liquid from the product. It is desirable to provide a method for efficiently and reliably coating delicate or easily deformable products, such as products molded from a pulp fiber slurry. The method includes fixing the product to a receiving portion of a product carrier that is configured in the same shape as the product, such that an exterior surface of the product abuts the interior concave surface of the receiving portion of the device. A coating liquid is applied to the product in the product carrier. The product carrier is affixed to a centrifuging device and the coating liquid is dispersed over the surface of the product using centripetal force.

20 Claims, 8 Drawing Sheets

(56) References Cited

U.S. PATENT DOCUMENTS

| | | | |
|---|---|---|---|
| 2,234,979 | A | 3/1941 | Emery |
| 3,864,206 | A | 2/1975 | Linderoth |
| 4,418,644 | A | 12/1983 | Young |
| 4,710,410 | A | 12/1987 | Narusch, Jr. |
| 6,811,531 | B2 | 11/2004 | Moscone, Sr. |
| 7,306,834 | B2 | 12/2007 | Nonomura et al. |
| 7,560,137 | B2 | 7/2009 | Zoppas et al. |
| 8,221,301 | B2 | 7/2012 | Yang |
| 9,209,062 | B1 | 12/2015 | Kukas |
| 11,471,910 | B2 | 10/2022 | Simonsen |
| 12,246,340 | B1 | 3/2025 | Dag et al. |
| 2001/0003966 | A1 | 6/2001 | Kitano et al. |
| 2003/0199382 | A1 | 10/2003 | Moscone, Sr. |
| 2004/0013830 | A1 | 1/2004 | Nonomura et al. |
| 2005/0150451 | A1 | 7/2005 | Tanaka et al. |
| 2007/0037684 | A1 | 2/2007 | Moscone et al. |
| 2013/0213597 | A1 | 8/2013 | Myerscough |
| 2014/0352943 | A1 | 12/2014 | Domec et al. |
| 2019/0202107 | A1 | 7/2019 | Vantrease |
| 2019/0345674 | A1 | 11/2019 | Lovenstein et al. |
| 2021/0046501 | A1* | 2/2021 | Simonsen ................ B05D 1/18 |
| 2022/0072583 | A1 | 3/2022 | Simonsen |
| 2023/0286011 | A1 | 9/2023 | Jongen et al. |
| 2023/0331449 | A1 | 10/2023 | Graham et al. |
| 2024/0200276 | A1 | 6/2024 | Winzinger et al. |

FOREIGN PATENT DOCUMENTS

| | | |
|---|---|---|
| DE | 102021207669 A1 | 1/2023 |
| EP | 2056972 B1 | 5/2009 |
| EP | 4122607 A1 | 1/2023 |
| JP | 4752288 B2 | 2/2005 |
| JP | 2012024744 A | 2/2012 |

\* cited by examiner

METHOD FOR COATING PRODUCTS

CROSS REFERENCES TO RELATED APPLICATIONS

This application is related to and claims priority to one or more prior filed patent applications. This application is a continuation of U.S. application Ser. No. 18/765,990, filed Jul. 8, 2024, which claims priority to and the benefit of German Patent Application No. 10 2023 129 975, filed Oct. 30, 2023, each of which is incorporated herein by reference in its entirety.

BACKGROUND OF THE INVENTION

1. Field of the Invention

The invention relates to a method and a system for coating products. In one embodiment, the invention relates to a coating method and system including removing excess coating liquid from the product by centrifugation.

2. Description of the Prior Art

The use of centrifuges in the coating of products is well known.

German Application No. DE 10 2021 207 669 A1 discloses a coating device with a centrifuging function for removing excess liquid. Two containers to be filled with parts to be coated are attached to a rotor and rotate about their longitudinal axis and an axis of rotation located between them. This device is used for coating small metallic parts, e.g. screws or nuts. These small parts are filled as bulk material into the containers having a wall with holes and then centrifuged. This coating method is only suitable for small parts that is operable to be processed as bulk material, not for delicate or easily deformable parts.

US Patent Pub. No. 2023/0286011 for Installation for treating mass-produced parts, with secondary drive device by inventors Jongen et al., filed Feb. 2, 2023 and published Sep. 14, 2023, is directed to an installation for treating mass-produced parts includes: a supporting structure with a supporting element, a basket carrier for at least two centrifuge baskets, a main drive device attached to the supporting structure and having a main drive and a longitudinal shaft, the longitudinal shaft being mounted rotatably about a main axis relative to the supporting element and being drivable rotatably about the main axis by the main drive, wherein the basket carrier is held suspended at the longitudinal shaft and is connected to the longitudinal shaft in a rotationally fixed manner, and a secondary drive device having at least one motor and, for each centrifuge basket, a drivetrain for rotating the centrifuge basket about a basket axis radially spaced from the main axis, wherein the at least one motor of the secondary drive device is arranged on the basket carrier.

U.S. Pat. No. 7,560,137 for Process and coating plant of containers by inventors Zoppas et al., filed Mar. 10, 2005 and issued Jul. 14, 2009, is directed to a process and relating plant for applying protective coats of paint to containers, especially plastic bottles. The process involves gripping the bottles by means of rotating gripping devices fastened to a conveyor chain, and conveying said bottles to all the different stations involved in the process: coating, drying, and curing. Centrifugation is used to remove any excess coating from the external surface of the bottles, keeping the bottles fastened to the same conveyor chain.

US Patent Pub. No. 2022/0072583 for Method for coating parts by inventor Simonsen, filed Nov. 17, 2021 and published Mar. 10, 2022, is directed to a method for coating parts in a dip-spin process includes dipping the parts to be coated a coating liquid and spinning the parts in a planetary centrifuge in at least a first planetary basket arrangement and a second planetary basket arrangement, which each provide a maximum receiving volume. The planetary centrifuge includes a main rotor rotating about a main rotor axis of rotation. The at least two planetary basket arrangements rotate about their planetary axes of rotation, wherein the planetary axes of rotation are arranged on the main rotor spaced from the main rotor axis of rotation. The first planetary basket arrangement is rotated about its respective planetary axis of rotation in the opposite direction to the second planetary basket arrangement during centrifugation, and the filling of the receiving volume is carried out at up to 50% of the maximum receiving volume of the planetary basket arrangement.

U.S. Pat. No. 9,209,062 for Removable spin chamber with vacuum attachment by inventor Kukas, filed May 28, 2014 and issued Dec. 8, 2015, is directed to a removable air flow control housing having a chamber for holding a substrate which is rotatable with and attachable by vacuum to a spin chuck of a spin coating apparatus. The housing has a lid in a top wall that can be hinged, screwed, magnetically secured or frictionally held in place. The chuck is nestable within a cutout region disposed within a central inner portion of the housing while an outer portion of the housing has a toroidal shape beyond edges of the chuck for reducing air turbulence and capturing excess coating fluid. The cutout region forms a shape that corresponds to the chuck shape. An upper cutout wall has vacuum holes in vertical alignment with vacuum holes of the chuck. The housing is attachable by vacuum to the chuck when the chuck is nested within the cutout region and the substrate is positioned on an upper surface of the upper cutout wall. The housing and substrate are rotatable with the chuck about a chuck axis of rotation as a coating solution is dispensed onto the substrate.

U.S. Pat. No. 11,471,910 for Method for coating parts in a dip centrifugation process by inventor Simonsen, filed Nov. 4, 2020 and issued Oct. 18, 2022, is directed to a coating method for coating parts in a dip-spin process. The parts to be coated are dipped into a coating liquid and then centrifuged in at least one planetary basket arrangement in a planetary centrifuge. The planetary centrifuge includes a main rotor rotating about a main rotor axis of rotation and at least one planetary basket arrangement rotates about its planetary axis of rotation. Also, the planetary axis of rotation is arranged eccentrically on the main rotor. The at least one planetary basket arrangement can include a plurality of planetary baskets rotatably arranged about the planetary rotation axis of the at least one planetary basket arrangement and the planetary basket arrangement is rotated during a centrifuging operation.

U.S. Pat. No. 4,710,410 for Dual basket small parts coating apparatus by inventor Narushch, filed Nov. 26, 1986 and issued Dec. 1, 1987, is directed to the contacting of articles with coating liquid such that there is provided increased through put of coated articles. Articles for coating, such as small metallic parts, are placed in a perforate, rotatable, typically wire basket and most often immersed in a tank containing a coating liquid. During this coating operation, an adjacent basket spaced apart from the first basket is discharging coated parts and subsequently taking on fresh parts for coating at a loading/unloading zone. Following this, and the coating of the parts in the first basket, the baskets are moved in a line, e.g., concurrently. The second basket with the fresh parts is moving to its own coating tank for parts coating while the first basket is moving to the zone for unloading coated parts and for loading of fresh uncoated parts. Thus essentially twice the production of coated parts can be produced in an efficient and economical manner. Furthermore the apparatus readily lends itself to ease in color change for coated parts.

US Patent Pub. No. 2005/0150451 for Position adjusting method and substrate processing system by inventors Tanaka et al., filed Jan. 6, 2005 and published Jul. 14, 2005, is directed to a coating treatment apparatus comprising a rotary holding member and a coating solution discharge member wherein positional adjustment of the holding position of the substrate with respect to the rotary holding member and a discharge position of a coating solution discharge member is quickly and accurately performed, so that the time required for the positional adjustment can be shortened. Further, variations in accuracy of the positional adjustment depending on the degree of proficiency of operator can be eliminated, realizing positional adjustment with a high precision at all times.

SUMMARY OF THE INVENTION

The present invention is directed to providing a method and a system for efficiently and reliably coating delicate or easily deformable products. The method for coating products is accomplished by fixing the product to a receiving portion of a product carrier and applying the coating to the product in the product carrier.

In one embodiment, the present invention includes a method for coating molded fiber products, including placing a molded fiber product in a product carrier, wherein the product carrier has a shape identical to the molded fiber product, conveying, via a first conveyor belt, the product carrier to a first coating station, coating a circumferential lip of the molded fiber product with a coating liquid, filling a concave section of the molded fiber product with the coating liquid, attaching the product carrier to a centrifugal axis, rotating the product carrier around the centrifugal axis, wherein an excess portion of the coating liquid is removed from a surface of the molded fiber product, and removing the product carrier from the centrifugal axis.

In another embodiment, the present invention includes a method for coating molded fiber products, including placing a molded fiber product in a product carrier, wherein the product carrier has a shape identical to the molded fiber product, weighing the product carrier with a first weighing device, wherein the first weighing device obtains a dry weight of the molded fiber product within the product carrier, conveying, via a first conveyor belt, the product carrier to a first coating station, coating a circumferential lip of the molded fiber product with a coating liquid, filling a concave section of the molded fiber product with the coating liquid, attaching the product carrier to a centrifugal axis, rotating the product carrier around the centrifugal axis, wherein an excess portion of the coating liquid is removed from a surface of the molded fiber product, removing the product carrier from the centrifugal axis, and weighing the product carrier with a second weighing device, wherein the second weighing device obtains a coated weight of the molded fiber product within the product carrier.

In yet another embodiment, the present invention includes a method for coating molded fiber products, including placing a molded fiber product in a product carrier, wherein the product carrier has a shape identical to the molded fiber product, wherein at least a portion of the product carrier is created using an additive manufacturing method, weighing the product carrier with a first weighing device, wherein the first weighing device obtains a dry weight of the molded fiber product within the product carrier, conveying, via a first conveyor belt, the product carrier to a first coating station, coating a circumferential lip of the molded fiber product with a coating liquid, wherein a flat dish containing the coating liquid is raised to the product carrier, wherein the product carrier is lowered and the circumferential lip of the molded fiber product is submerged in the coating liquid, filling a concave section of the molded fiber product with the coating liquid, attaching the product carrier to a centrifugal axis, rotating the product carrier around the centrifugal axis, wherein an excess portion of the coating liquid is removed from a surface of the molded fiber product, removing the product carrier from the centrifugal axis, weighing the product carrier with a second weighing device, wherein the second weighing device obtains a coated weight of the molded fiber product within the product carrier, and removing the molded fiber product from the product carrier, wherein the product carrier comprises an air conduit port and a plurality of flow channels, wherein a vacuum system is coupled to the air conduit port, wherein the vacuum system is configured to apply positive pressure to the product carrier.

These and other aspects of the present invention will become apparent to those skilled in the art after a reading of the following description of the preferred embodiment when considered with the drawings, as they support the claimed invention.

DETAILED DESCRIPTION

The present invention is generally directed to providing a method and a system for efficiently and reliably coating delicate or easily deformable products by utilizing a custom-shaped product carrier which supports at least parts of the product and stabilizes the shape of the product during coating. The coating is applied to the product while the product is in the product carrier.

In one embodiment, the present invention includes a method for coating molded fiber products, including placing a molded fiber product in a product carrier, wherein the product carrier has a shape identical to the molded fiber product, conveying, via a first conveyor belt, the product carrier to a first coating station, coating a circumferential lip of the molded fiber product with a coating liquid, filling a concave section of the molded fiber product with the coating liquid, attaching the product carrier to a centrifugal axis, rotating the product carrier around the centrifugal axis, wherein an excess portion of the coating liquid is removed from a surface of the molded fiber product, and removing the product carrier from the centrifugal axis.

In another embodiment, the present invention includes a method for coating molded fiber products, including placing a molded fiber product in a product carrier, wherein the product carrier has a shape identical to the molded fiber product, weighing the product carrier with a first weighing device, wherein the first weighing device obtains a dry weight of the molded fiber product within the product carrier, conveying, via a first conveyor belt, the product carrier to a first coating station, coating a circumferential lip of the molded fiber product with a coating liquid, filling a concave section of the molded fiber product with the coating liquid, attaching the product carrier to a centrifugal axis, rotating the product carrier around the centrifugal axis, wherein an excess portion of the coating liquid is removed from a surface of the molded fiber product, removing the product carrier from the centrifugal axis, and weighing the product carrier with a second weighing device, wherein the second weighing device obtains a coated weight of the molded fiber product within the product carrier.

In yet another embodiment, the present invention includes a method for coating molded fiber products, including placing a molded fiber product in a product carrier, wherein the product carrier has a shape identical to the molded fiber product, wherein at least a portion of the product carrier is created using an additive manufacturing method, weighing the product carrier with a first weighing device, wherein the first weighing device obtains a dry weight of the molded fiber product within the product carrier, conveying, via a first conveyor belt, the product carrier to a first coating station, coating a circumferential lip of the molded fiber product with a coating liquid, wherein a flat dish containing the coating liquid is raised to the product carrier, wherein the product carrier is lowered and the circumferential lip of the molded fiber product is submerged in the coating liquid, filling a concave section of the molded fiber product with the coating liquid, attaching the product carrier to a centrifugal axis, rotating the product carrier around the centrifugal axis, wherein an excess portion of the coating liquid is removed from a surface of the molded fiber product, removing the product carrier from the centrifugal axis, weighing the product carrier with a second weighing device, wherein the second weighing device obtains a coated weight of the molded fiber product within the product carrier, and removing the molded fiber product from the product carrier, wherein the product carrier comprises an air conduit port and a plurality of flow channels, wherein a vacuum system is coupled to the air conduit port, wherein the vacuum system is configured to apply positive pressure to the product carrier.

None of the prior art discloses individually attaching a molded fiber product to a receiving portion of a product carrier configured in the shape of the molded fiber product and attaching the product carrier to a holding device (i.e., a holding chamber) of a centrifuging device.

Fiber molded products are produced, for example, in a suction fiber molding process from fiber pulp or in a compression molding process from fiber slurry. Fiber molded products usually consist of thin-walled molded bodies, in the form of bowls, pots, bottles or similar containers, and are generally used for packaging. However, commodities such as razors or cutlery from fiber pulp are not easily produced. Fiber molded products are often coated to increase resistance to liquid and impermeability, but also to make them harder and more structurally resistant. Fiber products is operable to be very soft and easily deformable, especially when wet. They can therefore not be processed as bulk material during coating.

The present invention provides for coating of deformable products by providing a product carrier which supports the product as it is being coated and stabilizes the shape of the product as it is being coated. The method and system of the present invention meets the longstanding unmet need of coating a delicate fiber-based product while maintaining the integrity and shape of the fiber-based product.

The product is attached to a receiving portion of a product carrier that is custom shaped for the product to be received. The receiving portion supports at least parts of the product and thus stabilizes the shape of the product during coating. As explained in more detail below, the receiving portion is operable to have a shape that is complementary to the shape of the product. The external surface of the product completely contacts the surface of the receiving portion and is structurally supported during the entire coating process.

In one embodiment, the excess coating liquid is removed from the product by centrifugation. For this purpose, the product carrier is operable to be fixed to a holding device of a centrifuging device, and the holding device is operable to be rotated about an axis of rotation.

Instead of filling the products to be coated into a sieve-like container and then spinning the container, the products are attached individually to product carriers, which in turn are attached to the holding device of the centrifuging device. The holding device of the centrifuging device is configured to be rotated about an axis of rotation. The holding device is operable to be arranged at a radial distance from the axis of rotation so that an appropriate centrifugal force acts on the product in the product carrier attached to the holding device. For effective removal of coating liquid, the coated surface of the product in the product carrier should face in the radially outward direction with respect to the axis of rotation. The product carriers protect the shape of the products so that there is no risk of product deformation during the centrifuging process. The product carriers are detachably attached to the centrifuging device by means of the holding device. Thus, the centrifuging device is operable to be used to process a variety of different products. For a product change, it is sufficient to attach a different product carrier to the centrifuging device. In one embodiment, the product carrier is operable to be used for additional treatment processes before and/or after centrifugation. The product carrier is fixed to the centrifuging device only for the duration of the centrifugation process. It is operable to be transported to the holding device by means of an automatic transportation device such as a conveyor belt.

The product carrier is operable to have one receiving portion for one product or alternatively several receiving portions for several products. In one embodiment, the holding device is operable to comprise at least one movable locking element configured to engage a fixing portion of the product carrier. The movable locking element is operable to be a retractable projection that engages a corresponding recess in the product carrier. The movable locking element is operable to be moved electrically or pneumatically so that the product carrier is operable to be quickly released and replaced by a different product carrier.

In one embodiment, the centrifuging device is operable to have multiple holding devices that are arranged evenly distributed around the axis of rotation. For example, two holding devices is operable to be arranged with their radial center planes being offset by 180°. Alternatively, three holding devices is operable to be provided with a radial distance of 120° between the radial center planes of two subsequent holding devices.

In practice, the receiving portion of the product carrier is operable to be a trough having a shape substantially complementary to the external shape of a section of the product, wherein the product section is pressed into the trough. The outer contour of the product section nestles into the trough-shaped receiving portion so that the outer wall of the product is in substantially full contact with the concave surface of the trough. With the product carrier attached to the centrifuging device, the trough with the product accommodated therein opens outwardly with respect to the axis of rotation. The fact that the product nestles in the trough creates a certain amount of adhesion of the product in the receiving portion and prevents the product from detaching from the receiving portion during centrifugation. The coating liquid is applied to the radially outward facing surface of the product. As the holder is rotated by the centrifuging device about the axis of rotation, the coating liquid is removed from the coated surface. As explained in more detail below, the adhesion of the product to the holder is operable to be further increased, for example by applying a negative pressure to the trough-shaped receiving portion or by providing the receiving portion of the product carrier with a rough surface.

In the method described herein, the product carrier with the at least one receiving portion is operable to be manufactured using an additive manufacturing process. The size of the product carrier is predetermined by the holding device of the centrifuging device. If the product carrier is much larger than the product, the product carrier is operable to have multiple receiving portions, for example, 2 or 3 or even more receiving portions, each of which is operable to accommodate a product. By manufacturing the product carrier using an additive manufacturing process, in particular 3D printing, a suitable product carrier is operable to be manufactured quickly and inexpensively for each product. The product carrier is configured to be attached to the holding device of the centrifuging device. In particular, the ends of the product carrier is operable to be attached to the holding device by means of electric or pneumatic movable locking elements such as retractable projections. The product carriers is operable to have matching recesses into which the projections is operable to engage. This allows for a fast and reliable change of the product carrier. After each centrifuging process, the product carrier is operable to be removed and replaced with a product carrier carrying an uncoated product.

When manufactured by 3D printing or similar additive manufacturing processes, the surface of the product carrier is operable to be structured to provide a better grip for the product during the coating process. For example, protrusions or ribs are operable to be formed on the surfaces of the product carrier, which increase the friction between this surface and the product. The rough surface prevents the product from being ejected from the receiving portion of the product carrier during centrifuging. Additionally, air channels is operable to be formed in the product carrier in order to create a vacuum in the receiving portion of the product carrier that sucks the product into the receiving portion during centrifuging.

For releasing the product after coating, compressed air is operable to be guided through the air channels, which detaches the product from the product carrier and blows the product out of the receiving portion.

In one embodiment, the coating liquid is operable to be applied to the product by dipping at least portions of the product into a coating liquid, and/or pouring coating liquid into a concave section of the product.

The concave section of the product is conveniently coated by pouring in coating liquid while the product is accommodated in the receiving portion of the product carrier. For this purpose, dispensers for the coating liquid is operable to be arranged in the region above the product. The coating liquid is operable to be poured out of the concave section of the product by flipping the product carrier upside down. Portions of the product that are not concave, for example, a flange or lip extending along the periphery of the product, is operable to be coated by dipping these portions into coating liquid. This is operable to be done with the product accommodated in the product carrier before the product carrier is attached to the centrifuging device. A flat tray filled with coating liquid is operable to be arranged underneath the product carrier and moved towards the product in the product carrier so that the liquid in the tray wets the peripheral lip. The product carrier is operable to be fixed to the centrifuging device during the application of the coating liquid. Alternatively, the product carrier is operable to be moved to different coating stations by automatic handling means and then fixed to the centrifuging device. Finally, the product carrier is operable to be centrifuged for a predetermined period of time in order to remove excess liquid. During the entire process, the shape of the product is protected and maintained by the product carrier.

In the method described herein, the product is operable to be weighed before coating and after centrifugation to determine the weight of the product and/or the applied coating. The weight of the product before the first coating is operable to provide information about product properties. The centrifuging device is operable to be controlled by a digital control unit. This digital control unit is operable to be fed the value of the weight of the product before the first coating. From this value, for example, the properties of the coating to be applied to the product is operable to be derived. A product with a low weight is operable to have a lower wall thickness. If the coating increases the stability of the product, the number of subsequent coatings to be applied or the contact time and thus the time available for penetration of the coating liquid into the fiber product is operable to be increased. By weighing the product after coating, the difference between the determined weight and the weight before coating is operable to be calculated, which corresponds to the weight of the applied coating. The weight of the applied coating allows conclusions to be drawn about the completeness of the coating and thus about the product quality.

In one embodiment, the data of each coating process is operable to be recorded and stored. The data of the coating process is operable to contain the weight of the uncoated product and the weight of the applied coating. Additional data of the coating process is operable to be the selected type of coating liquid or environmental conditions of the coating process such as temperature, air pressure and humidity or other physical variables during the coating process is operable to be measured and stored. The stored data allows conclusions to be drawn about the product quality.

In a practical embodiment of the method described herein, the product is operable to be provided with a unique identifier and the stored data of the coating method is operable to be associated with the identifier. In other words, a barcode, QR code or other identifier is operable to be printed or imprinted on the surface of the product. The identifier is operable to be machine-readable. The identifier is operable to be used to retrieve the coating data associated with the particular product. This is advantageous, for example, if a product or a batch of products does not have the desired properties. By reading the identifier, all data associated with the product's coating is operable to be retrieved and, depending on the product's deficiency, the coating process is operable to be optimized to avoid such deficiencies in the future. The identifier is operable to be printed onto the surface of the product using invisible ink. For example, fluorescent ink that is visible only under an ultraviolet light is operable to be used for printing the identifier onto the product surface using an ink-jet printing process.

In one embodiment of the method described herein, centrifugation is operable to be performed at variable rotational speeds. In particular, intervals of high speed and intervals of low speed are operable to follow each other. The speed is operable to also be increased in intervals, particularly at the beginning of the centrifuging process, until it reaches its maximum value.

In one embodiment of the method, the centrifuging device is operable to be cleaned when the coating liquid is changed. Such cleaning is operable to be necessary when coating fluids are not mixed together or should not be mixed together. Cleaning the centrifuging device is operable to include at least one of the following steps: rinsing the centrifuging device with a cleaning liquid; replacing an enclosure which surrounds the product carrier during centrifuging and collects excess coating liquid.

If the coating liquids are operable to be removed without residue by rinsing, rinsing the centrifuging device with a cleaning liquid will be sufficient. If the coating liquid cannot be completely removed by a cleaning liquid, the centrifuge is operable to alternatively or additionally be provided with a replaceable enclosure. For example, the enclosure is operable to be made from molded pulp. When the coating liquid is changed, the replaceable enclosure is operable to be removed and disposed of. The method described herein is used in particular in the manufacture of biodegradable products. Consequently, biodegradable coatings are also applied. The enclosure wetted with the coating liquid is therefore also biodegradable and is operable to be disposed of without any problems.

The product is operable to be accommodated within the product carrier during further steps of the coating process such as drying the coated product in an oven with an elevated temperature or pressing the coated product in order to produce the final form of the product. In case of pressing, the product carrier is operable to serve as pressing form and the product is pressed into the receiving portion of the product carrier using a pressing die having a shape complementary to the shape of the product.

The technology described herein also relates to a system for coating products with a coating liquid. To solve the task mentioned above, the system comprises at least one product carrier with at least one receiving portion for holding the product. As mentioned above, the receiving portion stabilizes the product during the coating process.

In one embodiment, the system is operable to comprise a centrifuging device for removing excess coating liquid. The centrifuging device is operable to comprise at least one holding device for the product carrier and the holding device is operable to be arranged to be rotatable about an axis of rotation.

The entire coating process is operable to be executed with the product to be coated firmly held within the receiving portion of the product carrier so that the product carrier provides stability to the product. During the coating process, all forces and manipulation actions act on the product carrier that firmly holds the product. The product is nestled within the receiving portion of the product carrier and is thus protected against damages or deformation during the coating process.

In one embodiment, the receiving portion of the product carrier is operable to be a trough having a shape substantially complementary to the external shape of the product. This receiving portion preserves the shape of the product and protects the product. As explained above, the product carrier is operable to be a component manufactured using an additive manufacturing process. The receiving portion of the product carrier is operable to have a structured surface.

In one embodiment of the system, the holding device of the centrifuging device is operable to comprise at least one movable locking element and the product carrier is operable to comprise a complementary fixing portion for engaging the movable locking element. The movable locking element is operable to be automatically driven, e.g. by pneumatic or electric means, for fixing the product carrier to the holding device and for releasing the product carrier.

The product carrier is operable to have at least one port for an air conduit and flow channels leading from the port to the receiving portion. These flow channels is operable to be 3D printed. During centrifugation of the product, a negative pressure is operable to be applied to the port, which sucks the product to the product carrier and prevents the product from detaching from the product carrier due to the centrifugal force. After centrifugation, a positive pressure is operable to be applied to the port in order to release the product from the product carrier.

In one embodiment, the centrifuging device has a plurality of holding devices to which a plurality of product carriers is operable to be attached so as to rotate about a common axis of rotation. The holding devices is operable to be arranged at regular angular intervals (for example 180° in the case of two product carriers and 120° in the case of three product carriers) around the axis of rotation in order to achieve a balanced arrangement.

In one embodiment, the product carrier is operable to comprise at least one flexible seal, the seal contacting a surface of the product located adjacent to the receiving portion. In particular, a silicone seal or similar flexible seal is operable to be arranged in the periphery of the trough-shaped receiving portion for the product, and the lip-shaped, outwardly projecting flange of the product contacts this seal. The seal prevents coating liquid from entering the receiving portion of the product carrier and from contaminating the surface of the product that is not to be coated.

In one embodiment, the system described herein is operable to include at least one weighing device for determining the weight of the product and/or of the coating.

One embodiment of the system is operable to include at least one of: a digital control device; a data storage device; a data interface; a marking device for applying an identifier to the product.

As explained above, these devices are operable to be used for capturing and storing relevant data of the coating process and for providing the product with a unique identifier that is associated to the data of the coating process of the product in question.

In one embodiment, the system is operable to include a supply line for a cleaning fluid. Further, the system is operable to include a replaceable enclosure that surrounds the product carrier during centrifugation and collects excess coating liquid.

Referring now to the drawings in general, the illustrations are for the purpose of describing one or more preferred embodiments of the invention and are not intended to limit the invention thereto.

Figure 1:
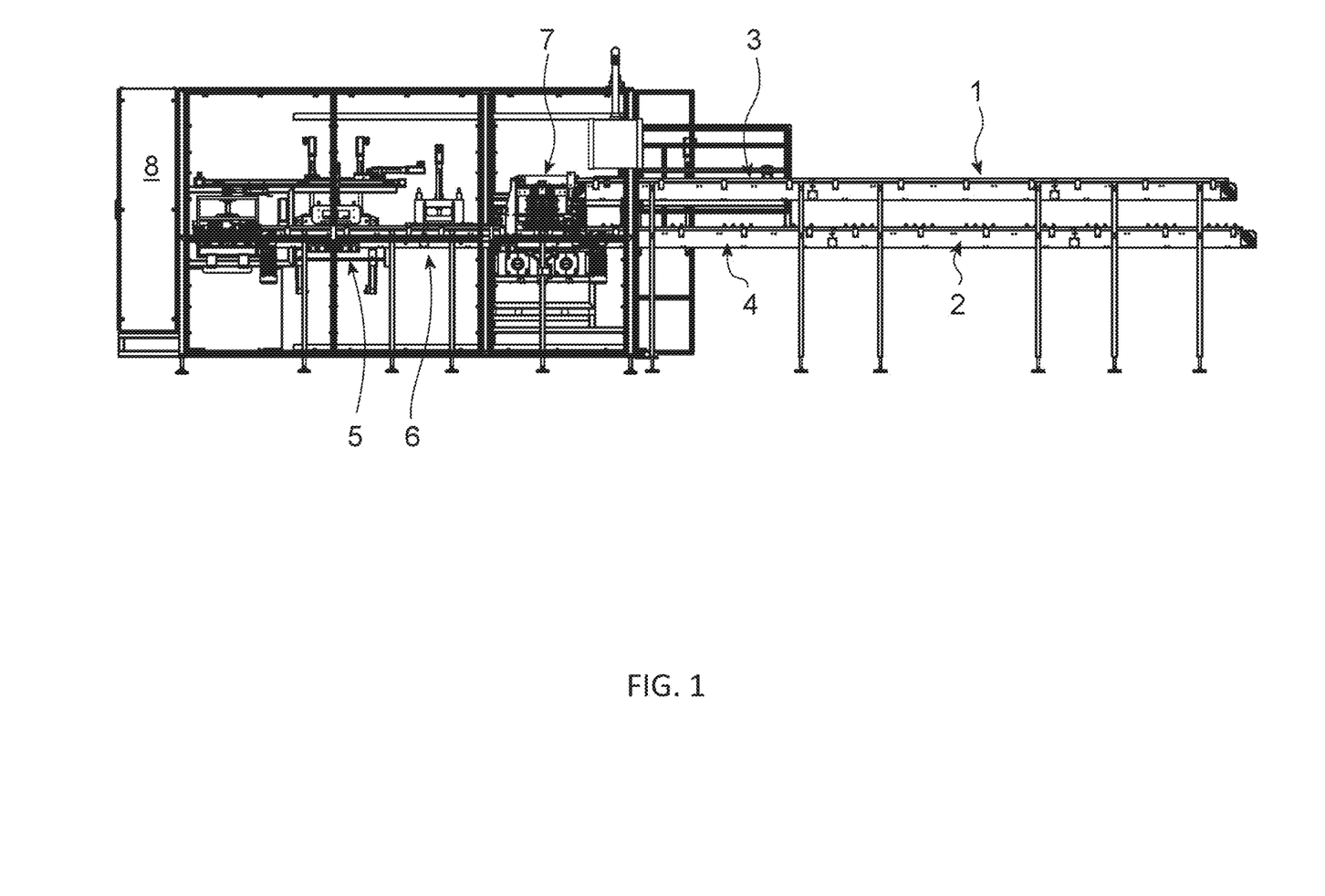
FIG. 1 illustrates a side view of a system for coating a pulp molded fiber product.

FIG. 1 illustrates a side view of a coating system for coating fiber molded products according to one embodiment of the present invention. The system includes a first conveyor 1 for conveying the products to the different coating stations. A second conveyor 2 moves the coated products out of the coating system to a tunnel oven (not shown). The first conveyor 1 includes a first weighing device 3 for weighing the dry weight of the product before coating. The second conveyor belt 2 includes a second weighing device 4 for weighing the coated product.

A first coating station 5 is provided for coating a circumferential lip or rim of the product. A filling station 6 fills concave sections of the product with coating liquid. A centrifuging device 7 explained further below spins the products around an axis of rotation in order to remove excess coating liquid. A digital control unit 8 controls the components of the system. Further, the digital control unit 8 obtains and stores the values received from the weighing stations 3, 4 as well as additional parameters of the coating process such as humidity and air temperature from appropriate sensors (not shown). All parameters of a coating process are stored in conjunction with a unique identifier. The unique identifier may be printed or otherwise attached to the product.

Figure 2:
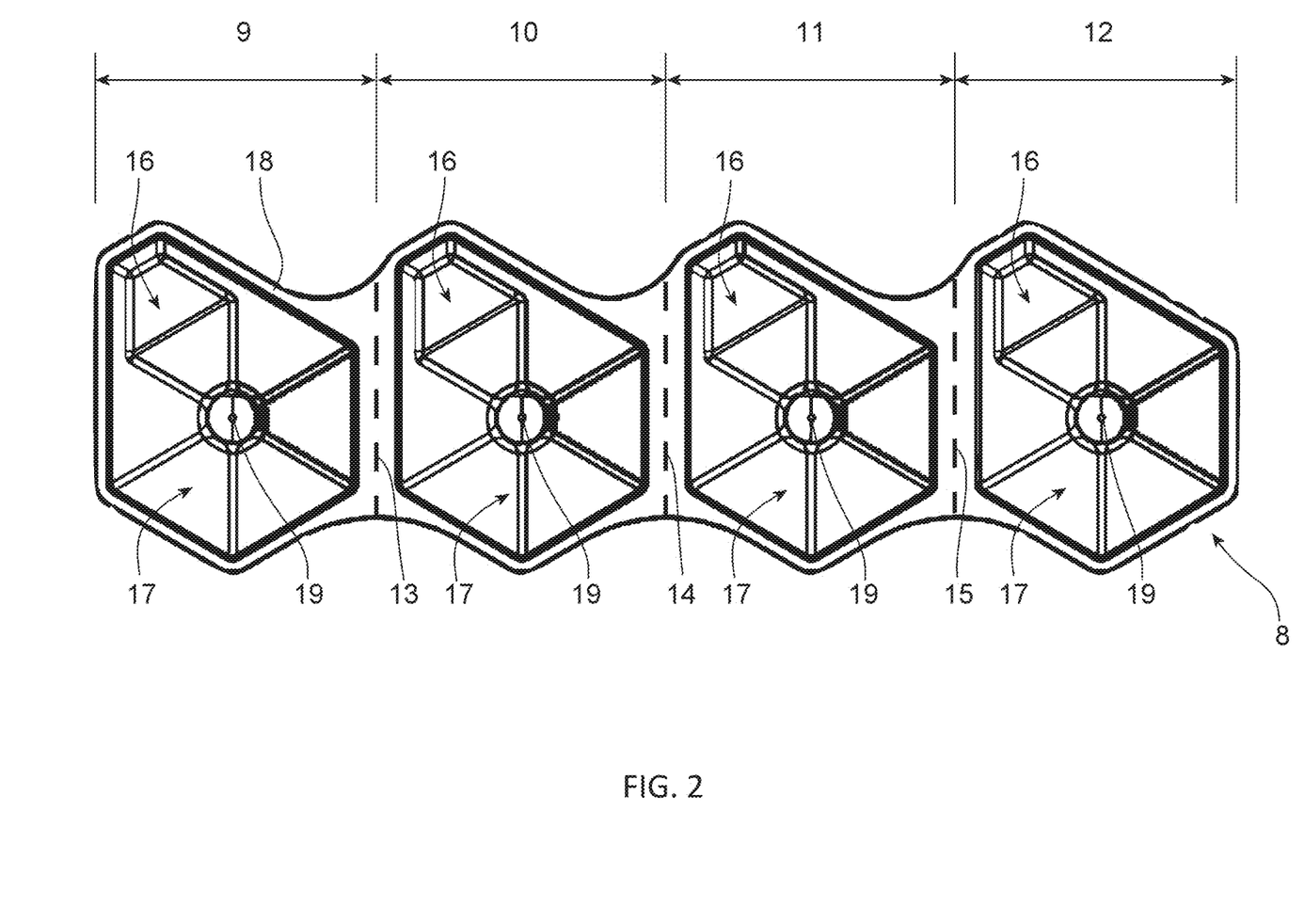
FIG. 2 illustrates a top plan view of a molded fiber product for coating.

FIG. 2 shows a top view of the product to be coated in a coating system according to one embodiment of the present invention. The product 8 is produced from fiber pulp and may be produced in a suction mold with a sieve or grid-like surface that is submersed in water with fiber pulp, water is sucked through the sieve of the suction mold and a layer of fibers with a thickness of in the order of 1 mm is disposed on the sieve. As an alternative the product may be produced using a compression molding process from a pulp slurry. The pulp slurry is provided to a concave mold and a complementary die compresses the pulp slurry into the desired shape and presses water out of the pulp. The resulting product may have a slightly larger wall thickness than a product formed in a suction mold. The product 8 shown in FIG. 2 has four concave sections 9, 10, 11, 12 separated by perforation lines 13, 14, 15. Each of the concave sections 9, 10, 11, 12 defines a handle 16 and a cup 17. Each cup 17 has the shape of a hexagonal pyramid with an open base and the apex 19 pointing towards the bottom. FIG. 2 shows a top view of the product 8 into the open base of each cup 17. A lip 18 or rim surrounds and connects all cups 17 and the handles 16. The lip 18 is basically flat and extends in the periphery of all concave sections 9, 10, 11, 12 defining the cups 17 and handles 16. The lip 18 extends in the plane with the largest distance from the apex 19 of the cups 17.

Figure 3:
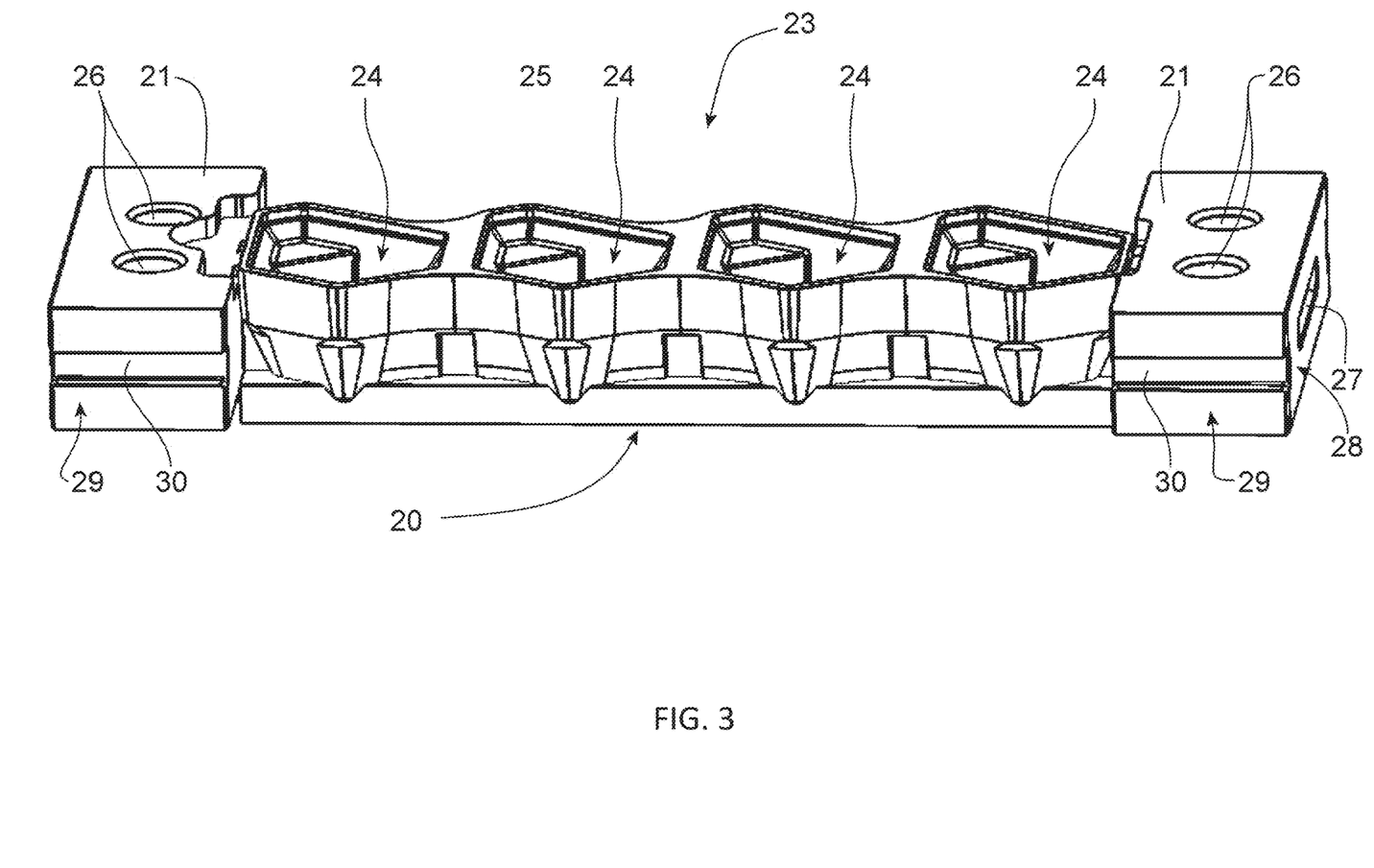
FIG. 3 illustrates a three-dimensional top view of a product carrier.
Figure 4:
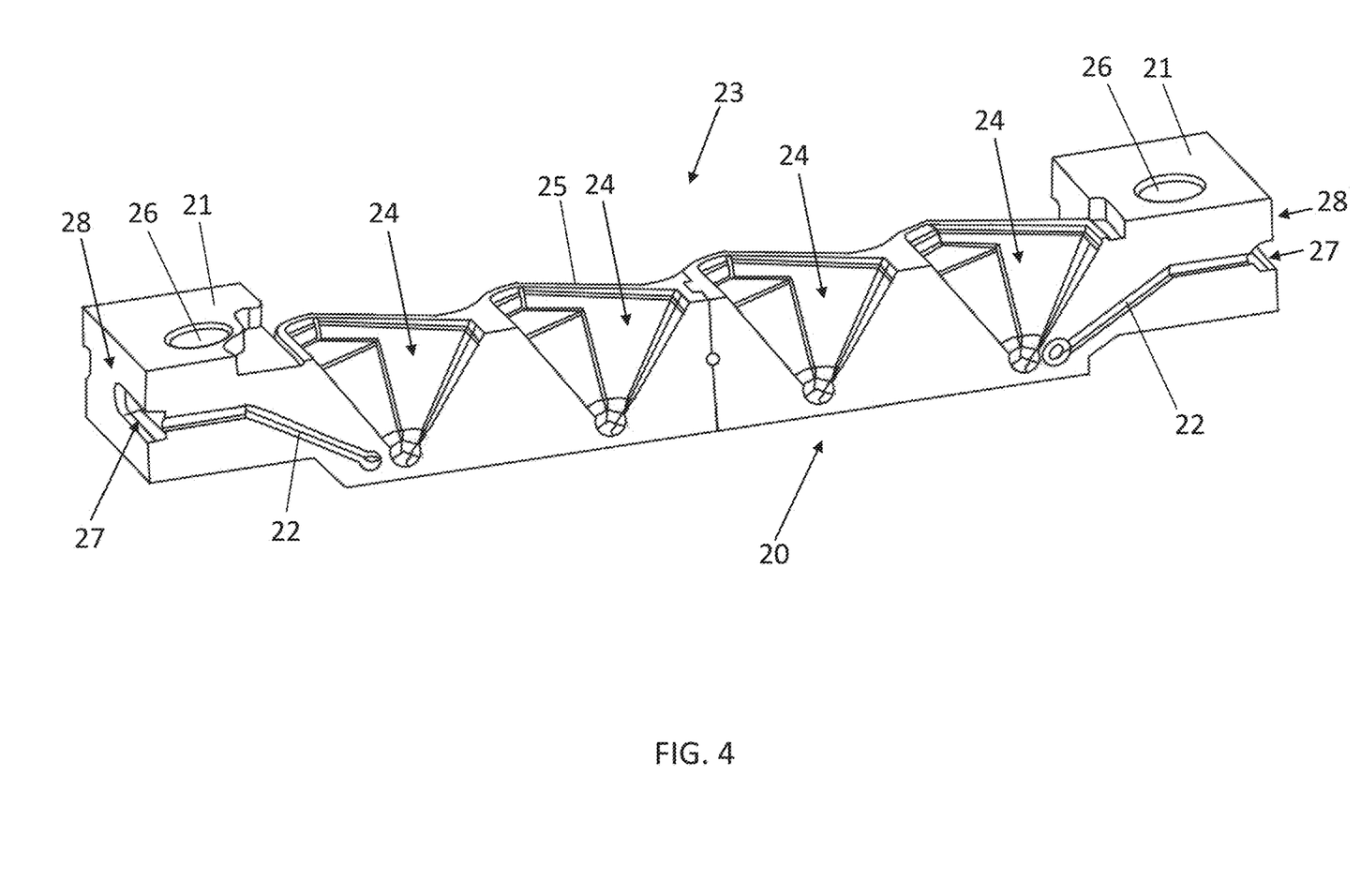
FIG. 4 illustrates a sectional view of the product carrier.

FIGS. 3 and 4 illustrate a product carrier according to one embodiment of the present invention. FIG. 3 depicts a three-dimensional side view of a product carrier 20, which is specifically designed to accommodate the product depicted in FIG. 2. FIG. 4 depicts a three-dimensional sectional view of the product carrier 20. The product carrier 20 has two fixing portions 21 and a receiving portion 23 between the two fixing portions 21. The receiving portion 23 has four concave sections 24 with a shape that is complementary to the shape of the cups 17 with the handles 16 of the product. The cups 17 and the handles 16 of the product are pushed into the concave sections 24 of the receiving portion 23. The walls of the thin-walled fiber product 8 are pressed against the concave walls of the concave sections 24 of the product carrier 20. The peripheral lip 18 of the product 8 rests on the top rim 25 of the product carrier 20. This top rim 25 may be made of silicone or another flexible material in order to seal the external surface of the product 8 placed inside the concave sections 9, 10, 11, 12 of the product carrier 20. Alternatively, a silicon seal (not shown) may be placed on the rim 18 in the periphery of the concave sections 9, 10, 11, 12. The sealing avoids that coating liquid soils the surface of the product 8 placed inside the concave sections 9, 10, 11, 12.

The products 8 may be placed within the product carriers 20 before being placed on the first conveyor 1. The products 8 rest in their product carriers 20 throughout the coating process and may be dried inside the product carriers 20 by moving the product carriers 20 with the products 8 through the tunnel oven. This provides structural stability to the thin-walled fiber products 8 throughout the coating process. The product carrier 20 may also serve as a compression mold after drying the product 8. A die with a shape complementary to the shape of the product surface facing away from the product carrier 20 may be pressed against the product in the product carrier 20 so that the fiber material is compressed and the product 8 is brought into its final shape. In an embodiment, the product carrier 20 may also serve as suction form for producing the fiber product from a liquid pulp. For this purpose, the internal walls of the product carrier 20 may be porous and connected to a suction pump. The fiber material will be deposited on the porous concave surface of the product carrier 20 in this process. The fiber material will then have to be dewatered and dried in the product carrier 20 before the coating can be applied.

The two fixing portions 21 of the product carrier 20 each have a pair of centering holes 26. These centering holes 26 are configured to accommodate complementary centering pins of a holding device when transported on the conveyors 1, 2 or fixed to the centrifuging device. Each fixing portion 21 has a recess 27 in the end face 28. This recess 27 may accommodate a movable locking element for attaching the product carrier 20 to a centrifuging device described in further detail below. The lateral face 29 on both sides of the fixing portion 21 of the product carrier 20 have further recesses in the form of a groove 30 that may accommodate further locking elements.

FIG. 4 further illustrates an embodiment of the present invention wherein the recess is configured to serves as a port for connecting pressurized air or a vacuum to the product carrier. A flow channel 22 connects the recess 27 to the concave sections 24 of the product carrier 20. By applying a negative pressure to the port (via the recess 27), the product 8 accommodated in the product carrier 20 will be sucked into the receiving portion 23 of the product carrier 20. By applying pressurized air to the port via the recess 27, the product 8 received in the receiving portion 23 of the product carrier may be blown out and ejected from the product carrier 20 after coating.

Figure 5:
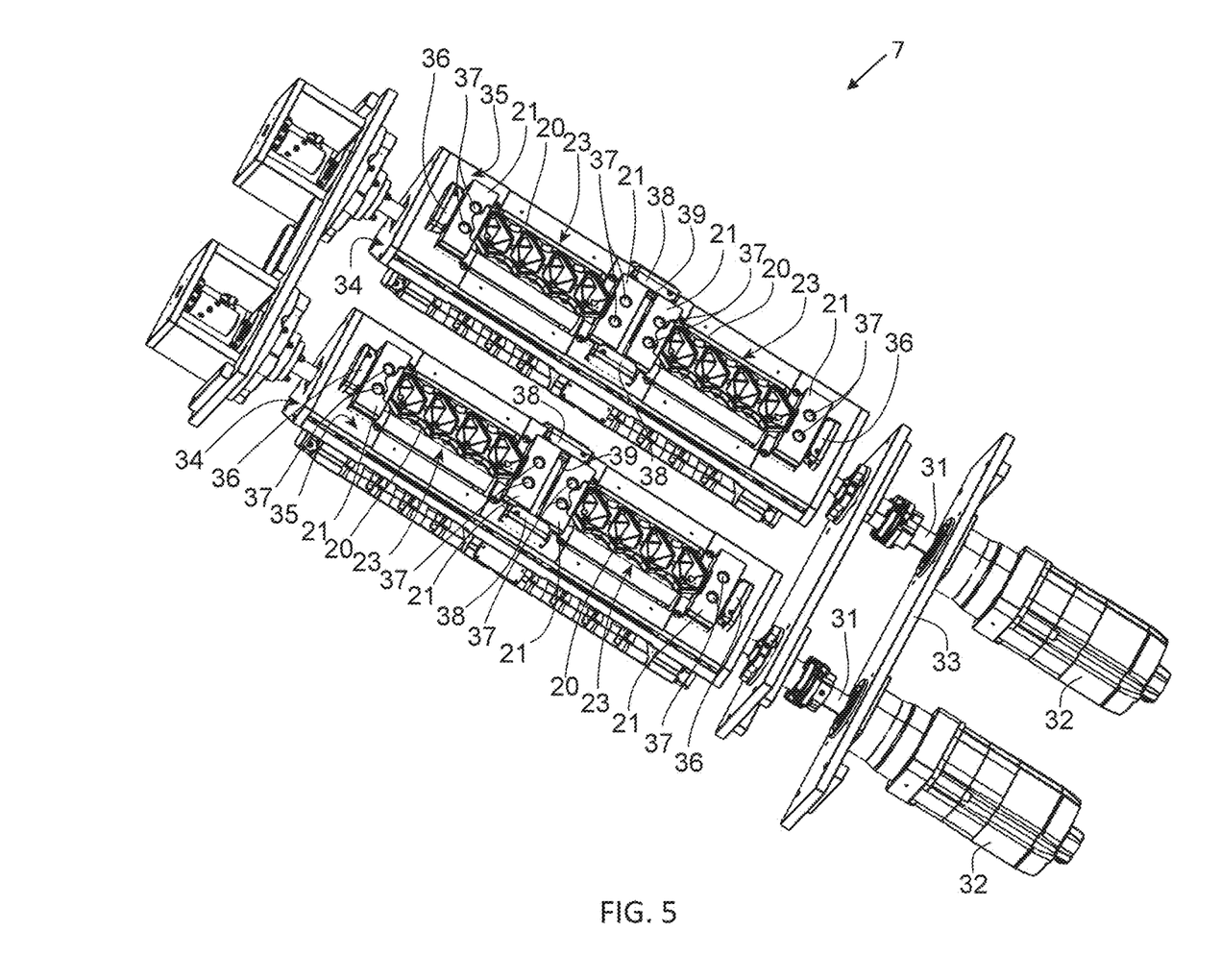
FIG. 5 illustrates a three dimensional top view of a centrifuging device having multiple product carriers.
Figure 6:
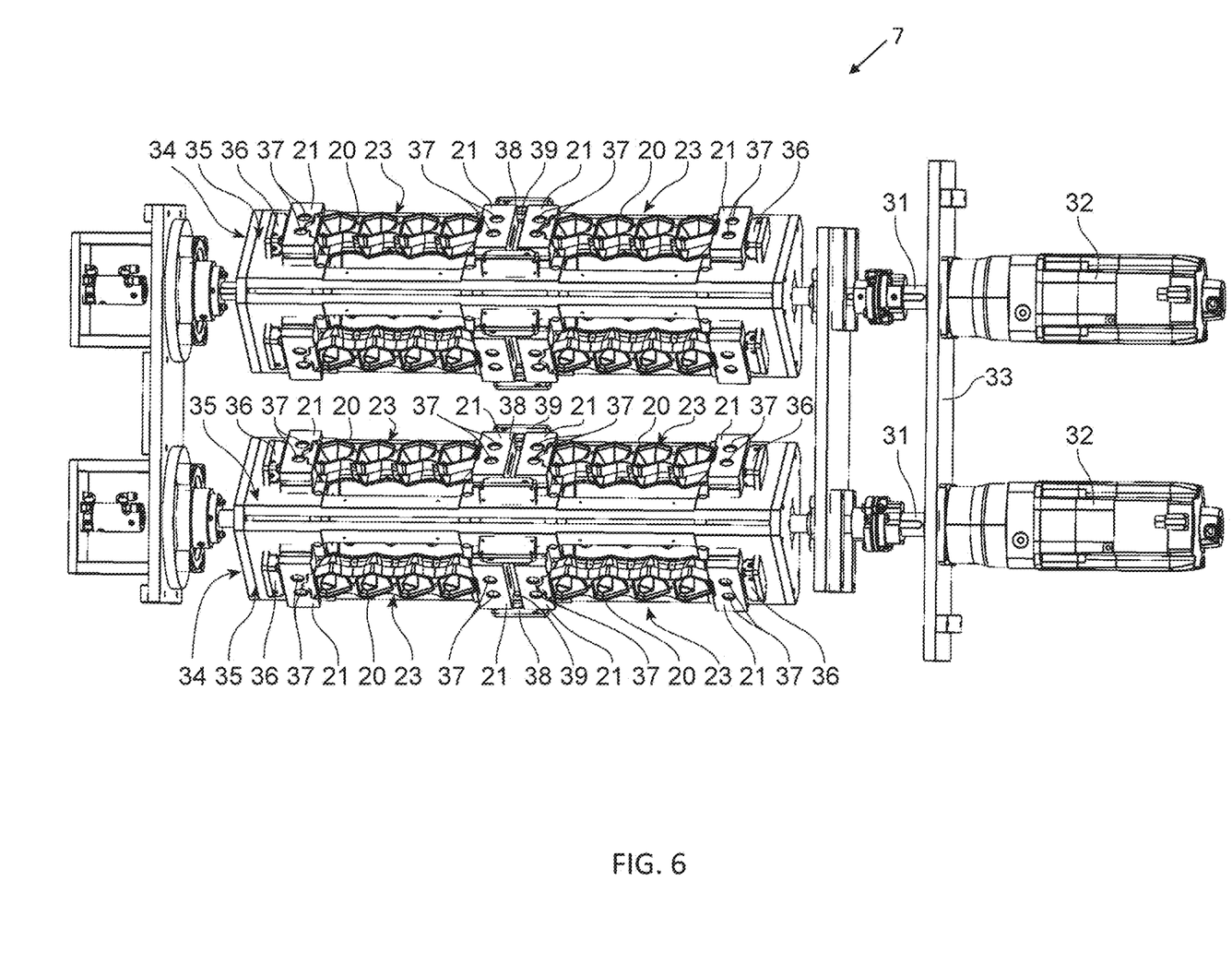
FIG. 6 illustrates a bottom view of a centrifuging device.

FIGS. 5 and 6 illustrate a centrifuging device according to one embodiment of the present invention. The centrifuging device 7 is used centrifuge the products 8 held within the product carriers 20. The centrifuging device 7 includes a pair of parallel axes of rotation 31, each driven by an electric drive motor 32 mounted to a frame segment 33 of a frame of the coating unit. Each drive motor 32 drives a spinning element 34 comprising multiple holding devices for product carriers 20. The spinning element 34 has a triangular shape and defines three mounting surfaces 35 for product carriers 20. Each mounting surface 35 comprises holding devices for two product carriers 20.

The holding devices include longitudinal abutments 36 with a movable locking element (not shown) having a shape complementary to the shape of the recesses 27 in the end faces 28 of the fixing portions 21. The holding devices further include centering pins 37 that fit into the centering holes 26 of the product carriers 20 and fix the position of the product carriers 20 on the mounting surface 35. Each product carrier 20 is fixed with one pair of centering pins 37 in the central region of the mounting surface 35 and one pair of centering pins 37 at a longitudinal end of the mounting surface 35. These centering pins 37 penetrate the centering holes 26 of the fixing portions 21. Two lateral fixing blocks 38 having lateral locking elements 39 are arranged on both sides of the central fixing elements 21 for the two product carriers 20. The lateral locking elements 39 are also movable, for example by means of a pneumatic or electric actuator. The lateral locking elements 39 project into the lateral grooves or recesses 30 on the lateral faces 29 of the fixing elements 21.

For mounting a product carrier 20 to a mounting surface 35, it is sufficient to push the centering holes 26 of the fixing portions 21 onto the centering pins 37 while the locking elements 39 of the fixing blocks 38 and the abutments 36 are retracted. When the fixing elements 21 contact the mounting surface 35, the locking elements 39 may be pushed out of the lateral fixing blocks 38 and the abutments 36 into the recesses 27, 30 in the fixing elements 21.

The three mounting surfaces 35 of the spinning element 34 are oriented at an angle of 120° with respect to each other. Thus, the spinning element 34 is balanced and may be rotated at a high rotational speed to remove excess coating liquid applied to the surface of the product 8 facing away from the axis of rotation 31.

After spinning the products 8 fixed to the product carriers 20 for a predefined period of time with a predefined rotational speed, the product carriers 20 may be removed from the mounting surfaces 35 and moved to the next station in the manufacturing system.

Figure 7:
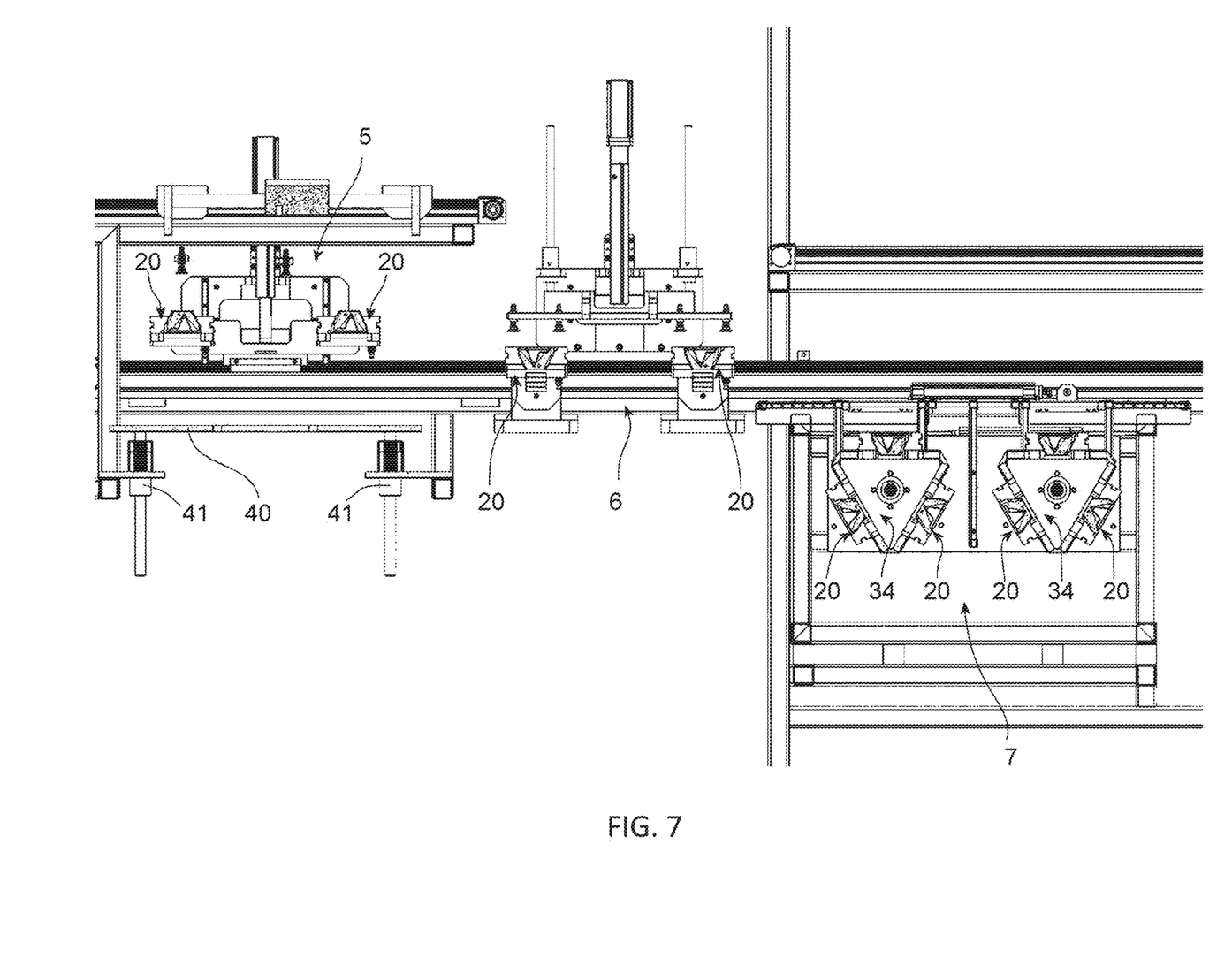
FIG. 7 illustrates an enlarged view of the view of a coating unit including centrifuging devices.

FIG. 7 shows a schematic side view of the three main coating devices of the system of the present invention. The first coating station 5 carries two product carriers 20 upside down. This means that the apex of the pyramid holding the cup 17 of the product is directed upwardly. The lip 18 extending around the periphery of the product 8 is located at the bottom of the product carriers 20 in the first coating station 5. The lip 18 is dipped into a flat dish 40 below the product carriers 20 filled with coating liquid. For this purpose, the flat dish 40 may be moved up by two air cylinders 41. After dipping the lip 18 into the coating liquid, the flat dish 40 is moved back down and the product carriers 20 are moved to the next station, filling station 6.

The product carriers 20 are inverted into their upright position with the cups 17 of the products 8 at the top of the product carrier 20. In this position, coating liquid is operable to poured into the cups 17 of the products 8 in order to fill the cups 17 and the handles 16 completely. This is accomplished through the use of one or more nozzles to dispense a coating liquid into the cups 17 or manually pouring coating liquid into the cups 17. The product carriers 20 are then swiveled or flipped to pour out the liquid. Then the product carriers 20 are moved to the centrifuging device 7 and fixed to the mounting surfaces 35 of the spinning elements 34 as explained above.

In one embodiment, the centrifuging device may be encased in an enclosure that catches coating liquid that is removed from the products using the centripetal force applied by the centrifuge device.

Figure 8:
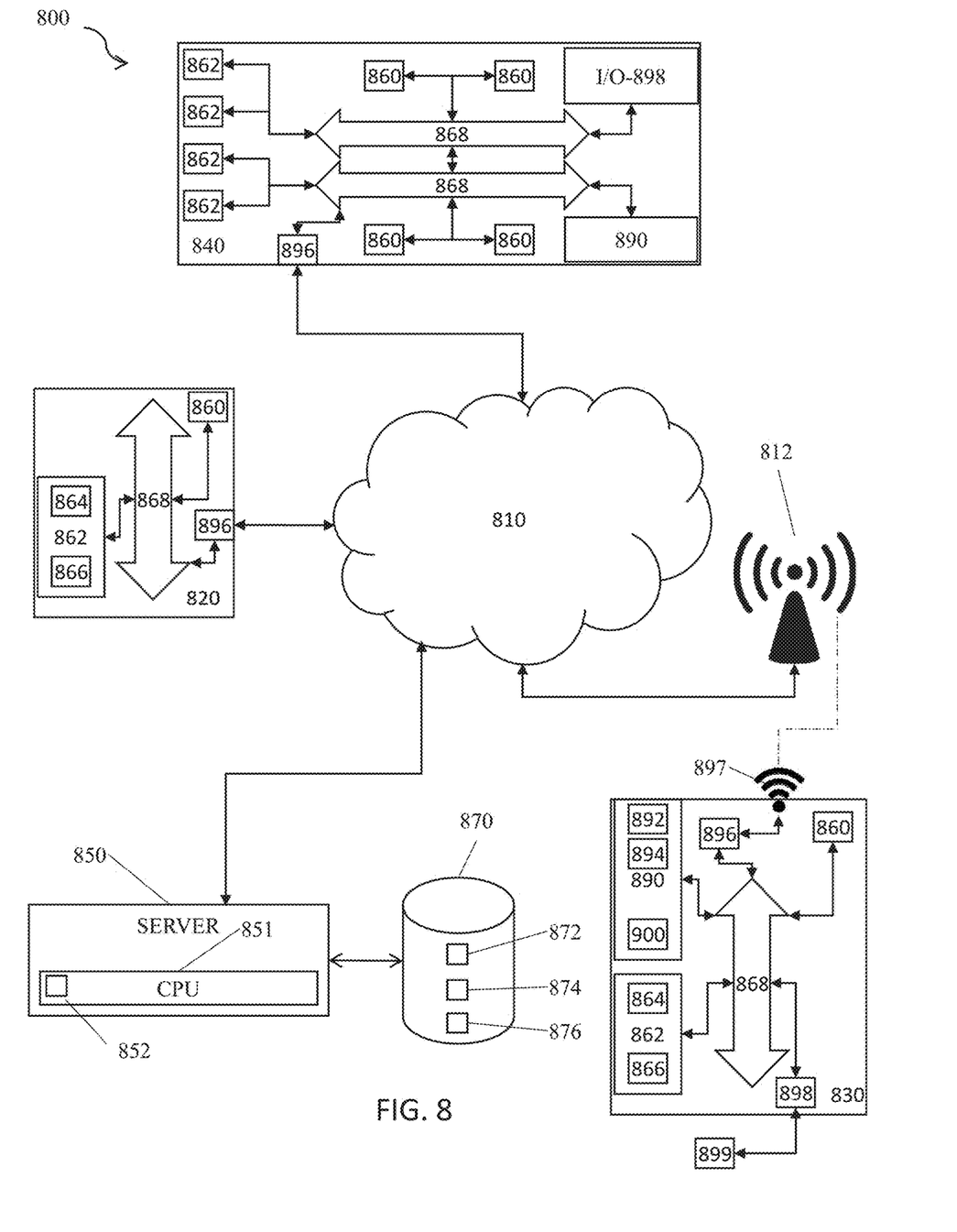
FIG. 8 is a schematic diagram of a system of the present invention.

FIG. 8 is a schematic diagram of an embodiment of the invention illustrating a computer system, generally described as 800, having a network 810, a plurality of computing devices 820, 830, 840, a server 850, and a database 870. One of ordinary skill in the art will appreciate that the controller unit of the present invention is a computing device, configured to receive and transmit wireless transmissions across the computer system.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 8, is operable to include other components that are not explicitly shown in FIG. 8, or is operable to utilize an architecture completely different than that shown in FIG. 8. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for coating molded fiber products, comprising:
    placing a molded fiber product in a product carrier, wherein the product carrier has a shape identical to the molded fiber product;
    filling a concave section of the molded fiber product with a coating liquid;
    attaching the product carrier to a centrifugal axis; and
    rotating the product carrier around the centrifugal axis, wherein an excess portion of the coating liquid is removed from a surface of the molded fiber product.

2. The method of claim 1, further comprising locking the product carrier within a holding device, wherein the holding device is located at a radial distance from the centrifugal axis.

3. The method of claim 1, further comprising applying negative pressure to the molded fiber product within the product carrier, wherein the product carrier comprises an air conduit port and a plurality of flow channels, wherein a vacuum system is coupled to the air conduit port, wherein the vacuum system is configured to apply negative pressure to the product carrier.

4. The method of claim 1, further comprising removing the molded fiber product from the product carrier, wherein the product carrier comprises an air conduit port and a plurality of flow channels, wherein a vacuum system is coupled to the air conduit port, wherein the vacuum system is configured to apply positive pressure to the product carrier.

5. The method of claim 1, further comprising weighing the product carrier with at least one weighing device, wherein the at least one weighing device obtains a dry weight of the molded fiber product and a coated weight of the molded fiber product.

6. The method of claim 1, further comprising sealing a portion of the product carrier upon placing the molded fiber product within the product carrier, wherein the product carrier comprises at least one flexible seal, wherein the at least one flexible seal is configured to contact a portion of the molded fiber product within the product carrier.

7. The method of claim 1, further comprising rotating the product carrier around the centrifugal axis at variable rotational speeds.

8. The method of claim 1, further comprising drying the molded fiber product within the product carrier.

9. The method of claim 1, further comprising pressing the molded fiber product within the product carrier.

10. A method for coating molded fiber products, comprising:
    placing a molded fiber product in a product carrier, wherein the product carrier has a shape identical to the molded fiber product;
    weighing the product carrier with a first weighing device;
    filling a concave section of the molded fiber product with a coating liquid;
    attaching the product carrier to a centrifuging device having a centrifugal axis;
    rotating the product carrier around the centrifugal axis, wherein an excess portion of the coating liquid is removed from a surface of the molded fiber product;
    removing the product carrier from the centrifugal axis; and
    weighing the product carrier with a second weighing device.

11. The method of claim 10, further comprising applying negative pressure to the molded fiber product within the product carrier, wherein the product carrier comprises an air conduit port and a plurality of flow channels, wherein a vacuum system is coupled to the air conduit port, wherein the vacuum system is configured to apply negative pressure to the product carrier.

12. The method of claim 10, further comprising removing the molded fiber product from the product carrier, wherein the product carrier comprises an air conduit port and a plurality of flow channels, wherein a vacuum system is coupled to the air conduit port, wherein the vacuum system is configured to apply positive pressure to the product carrier.

13. The method of claim 10, further comprising attaching at least one additional product carrier containing at least one additional molded fiber product to the centrifuging device having a centrifugal axis prior to rotating the centrifugal axis.

14. The method of claim 10, further comprising drying the molded fiber product within the product carrier.

15. The method of claim 10, further comprising pressing the molded fiber product within the product carrier.

16. A method for coating molded fiber products, comprising:
    placing a molded fiber product in a product carrier, wherein the product carrier has a shape identical to the molded fiber product;
    conveying, via a first conveyor belt, the product carrier to a first coating station;
    filling a concave section of the molded fiber product with a coating liquid;
    attaching the product carrier to a centrifuging device having a centrifugal axis;
    rotating the product carrier around the centrifugal axis, wherein an excess portion of the coating liquid is removed from a surface of the molded fiber product;
    removing the product carrier from the centrifugal axis; and
    removing the molded fiber product from the product carrier, wherein the product carrier comprises an air conduit port and a plurality of flow channels, wherein a vacuum system is coupled to the air conduit port, wherein the vacuum system is configured to apply positive pressure to the product carrier.

17. The method of claim 16, further comprising applying negative pressure to the molded fiber product within the product carrier, wherein the vacuum system is configured to apply negative pressure to the product carrier.

18. The method of claim 16, further comprising attaching at least one additional product carrier containing at least one additional molded fiber product to the centrifuging device having a centrifugal axis prior to rotating the centrifugal axis.

19. The method of claim 16, further comprising drying the molded fiber product within the product carrier.

20. The method of claim 16, further comprising pressing the molded fiber product within the product carrier.

* * * * *